US011513691B2

(12) United States Patent
Srimal et al.

(10) Patent No.: US 11,513,691 B2
(45) Date of Patent: Nov. 29, 2022

(54) SYSTEMS AND METHODS FOR POWER AND PERFORMANCE IMPROVEMENT THROUGH DYNAMIC PARALLEL DATA TRANSFER BETWEEN DEVICE AND HOST

(71) Applicant: Western Digital Technologies, Inc., San Jose, CA (US)

(72) Inventors: Niraj Srimal, Bangalore (IN); Adarsh Sreedhar, Bangalore (IN); Rakshit Tikoo, Bangalore (IN); Aditya Gadgil, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/182,099

(22) Filed: Feb. 22, 2021

(65) Prior Publication Data

US 2022/0221990 A1  Jul. 14, 2022

Related U.S. Application Data

(60) Provisional application No. 63/135,604, filed on Jan. 9, 2021.

(51) Int. Cl.
*G06F 3/06* (2006.01)
(52) U.S. Cl.
CPC .......... *G06F 3/0613* (2013.01); *G06F 3/067* (2013.01); *G06F 3/0631* (2013.01); *G06F 3/0635* (2013.01); *G06F 3/0659* (2013.01); *G06F 3/0683* (2013.01)

(58) Field of Classification Search
CPC .... G06F 3/0613; G06F 3/0631; G06F 3/0635; G06F 3/0659; G06F 3/067; G06F 3/0683
See application file for complete search history.

(56) References Cited

U.S. PATENT DOCUMENTS

| 2003/0188098 | A1* | 10/2003 | Baxter, III | G06F 3/0613 711/113 |
| 2005/0232589 | A1* | 10/2005 | Kimura | G06F 3/0613 386/E5.002 |
| 2009/0300234 | A1* | 12/2009 | Haga | G06F 5/12 710/56 |
| 2016/0253091 | A1* | 9/2016 | Ayyavu | G06F 3/061 711/103 |
| 2017/0346881 | A1* | 11/2017 | Zhang | H04L 67/06 |
| 2018/0150255 | A1* | 5/2018 | Woo | G06F 13/28 |
| 2018/0253391 | A1* | 9/2018 | Lee | G06F 3/0679 |

(Continued)

*Primary Examiner* — Nicholas J Simonetti
(74) *Attorney, Agent, or Firm* — Chang & Hale LLP (57) ABSTRACT

Systems and methods are disclosed for providing parallel data transfer. In certain embodiments, a data storage device includes a non-volatile memory and a controller configured to: receive a command from a host to obtain a file stored in the non-volatile memory; determine a plurality of channels available between the host and the data storage device; dynamically divide the file into a plurality of chunks based at least in part on the plurality of channels; perform load balancing to determine a first chunk of the plurality of chunks to be sent over a first channel of the plurality of channels and at least a second chunk of the plurality of chunks to be sent over a second channel of the plurality of channels; and simultaneously transmit the first chunk over the first channel and the second chunk over the second channel.

20 Claims, 8 Drawing Sheets

(56) References Cited

U.S. PATENT DOCUMENTS

| 2019/0042157 A1* | 2/2019 | Bonen | G06F 3/0659 |
| 2019/0278500 A1* | 9/2019 | Lakshmi | G06F 3/0688 |
| 2020/0004671 A1* | 1/2020 | Neufeld | G11C 16/10 |
| 2020/0184461 A1* | 6/2020 | Seal | G06Q 20/409 |

* cited by examiner

FIG. 1

Storage Device 245

Wi-Fi 802.11n  450 Mbps
Bluetooth 4.0  25 Mbps

250

| | 250a | 250b | 250c | 250d | 250e | 250f | 250g |
|---|---|---|---|---|---|---|---|
| | 1 | 2 | 3 | 4 | 5 | 6 | 7 |
| Size (in Mb) | 1800 | 25 | 25 | 900 | 100 | 25 | 450 |
| Channel | Wi-Fi | Bluetooth | Bluetooth | Wi-Fi | Bluetooth | Bluetooth | Wi-Fi |

255

| | | | | | |
|---|---|---|---|---|---|
| Wi-Fi 802.11n | | 1 | | 4 | 7 |
| Bluetooth 4.0 | 2 | 3 | | 5 | 6 |

SYSTEMS AND METHODS FOR POWER AND PERFORMANCE IMPROVEMENT THROUGH DYNAMIC PARALLEL DATA TRANSFER BETWEEN DEVICE AND HOST

CROSS-REFERENCE TO RELATED APPLICATION(S)

This application claims the benefit of U.S. Provisional Patent Application No. 63/135,604, filed Jan. 9, 2021, entitled "SYSTEMS AND METHODS FOR POWER AND PERFORMANCE IMPROVEMENT THROUGH DYNAMIC PARALLEL DATA TRANSFER BETWEEN DEVICE AND HOST," which is hereby expressly incorporated by reference herein in its entirety for all purposes.

BACKGROUND

Field

The present disclosure relates to data storage systems. In particular, the present disclosure relates to parallel data transfer in data storage systems.

Description of Related Art

Users may access data, such as files, in various types of data storage systems/architectures. In some cases, multiple channels can be available for data transfer between a computing device and a storage system.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Storage Systems for Parallel Data Transfer

A computing device associated with a user can read data from and/or write data to a storage system. Multiple channels can be available for transfer of data between the computing device and the storage system, such as Universal Serial Bus (USB), Wi-Fi, Bluetooth, etc. Generally, the computing device can send a read request over a selected channel out of the available channels and receive the requested data over the selected channel. For instance, a channel can be selected from the available channels by the computing device. Similarly, the computing device can send a write request over a selected channel out of the available channels and send the data for writing over the selected channel. However, in some cases, the selected channel may not be sufficient to achieve a desired speed or performance and may also become a bottleneck, for example, because of the transfer speed of the computing device.

In order to address these and other challenges, a storage system according to certain aspects can provide parallel data transfer between a computing device and the storage system. For example, parallel data transfer can be provided between a computing device and a storage device of the storage system. The storage device can leverage available channels to optimize and load balance data transfer between the computing device and the storage device. For instance, storage parameters associated with the storage device can be accessed and used for load balancing. The load balancing can be performed by a controller of the storage device at the firmware level. Parallel data transfer over multiple channels can be used to send different files or different portions of one file. To facilitate parallel data transfer, a separate region in a transfer random-access memory (TRAM) of the controller can be created for each available channel. In some cases, parallel data transfer can be employed in transferring media files between the computing device and the storage device. For example, a user may request playback of a media file from the computing device, and the storage device can send video data over one channel and audio data over another channel to transfer data for the media file in parallel.

In this way, the storage system as described herein can increase performance and reduce power consumption by leveraging parallel data transfer through multiple available transfer channels. The storage system can also facilitate multiple read requests or write requests from multiple computing devices. Details relating to the storage system for providing parallel data transfer are provided below.

Figure 1:
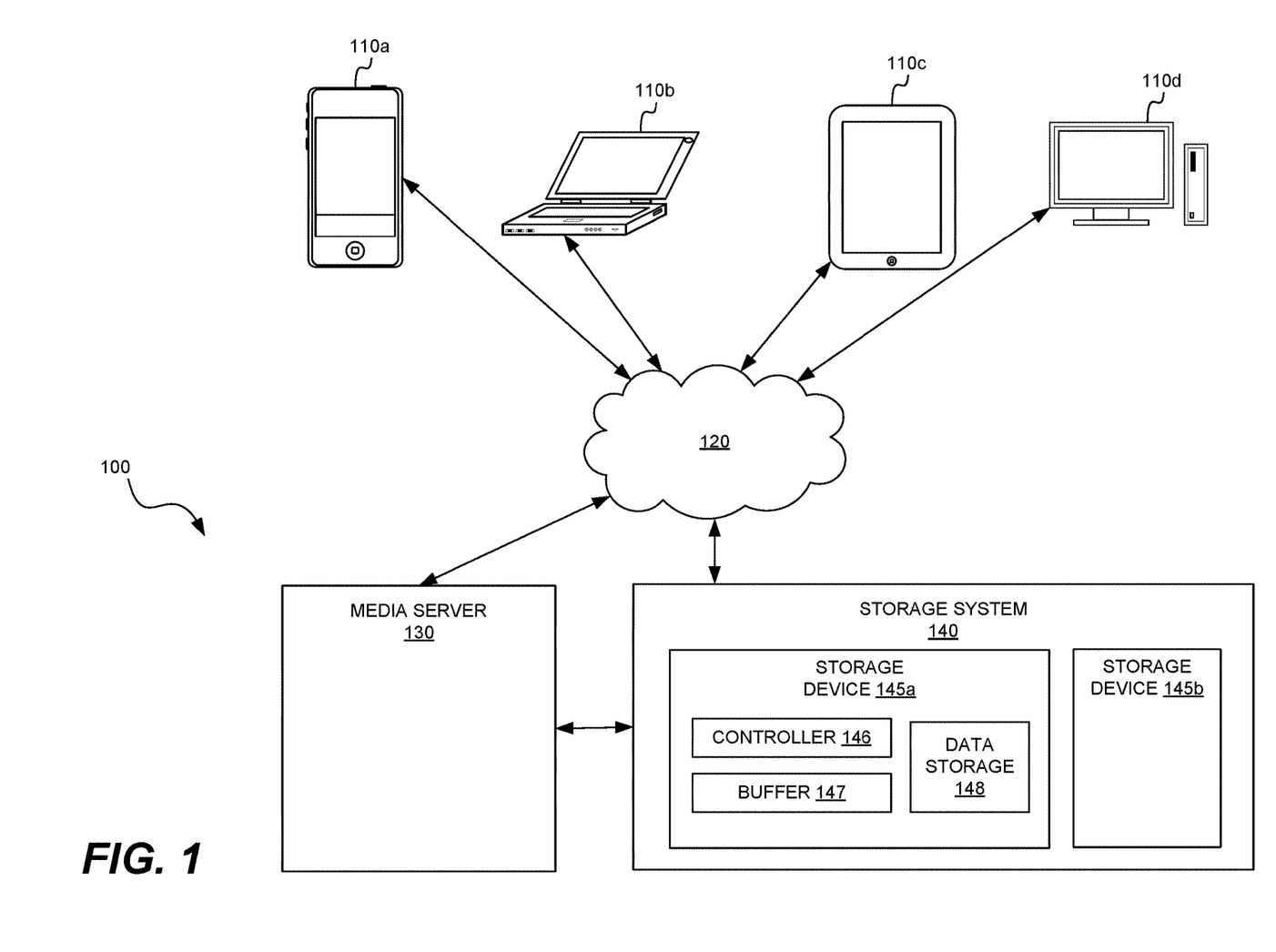
FIG. 1 illustrates an example system architecture for an example storage system relating to providing parallel data transfer, in accordance with one or more embodiments.

FIG. 1 illustrates an example system architecture 100 for an example storage system 140 relating to providing parallel data transfer, in accordance with one or more embodiments. The architecture 100 can include one or more user or client computing devices 110. The one or more client computing devices 110 may be coupled to the storage system 140 directly or via a network 120. In some cases, the one or more client computing devices 110 may also be coupled to one or more media servers 130 via the network 120. Types of client computing devices 110 that may access the storage system 140 can include phones 110a, such as smartphones, laptop computers 110b, tablet computers 110c, desktop computers 110d, wearable computers and/or other network-connected computing devices. The network 120 may be a local area network (LAN), a wide area network (WAN) (e.g., the Internet), or other type of computer network, and the connections between the various client components of the architecture 100 and the network 120 may be either wired or wireless.

The architecture 100 can also include the storage system 140 for providing parallel data transfer. In some cases, the media server 130 may be coupled to the storage system 140 directly or via the network 120. The storage system 140 can include one or more storage devices 145. A storage device 145*a* can include a controller 146, a buffer 147, and data storage 148 (e.g., non-volatile memory). A storage device 145*b* can also include similar components. The storage system 140 may store data and/or data objects that may be accessed by the client computing devices 110 and/or the media server 130. The storage system 140 may include multiple storage devices 145 (e.g., multiple storage drives such as hard disk drives (HDDs), solid state drives (SSDs), etc.). A storage device 145 may comprise magnetic media (e.g., magnetic discs, shingled magnetic recording (SMR) media/discs, etc.) and/or solid-state media.

While certain embodiments are described herein, it should be understood that different types of storage devices and random-access memory (RAM) technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as resistive random-access memory (ReRam), phase-change memory (PCM), and magnetoresistive random-access memory (MRAM).

A user may access data stored in the storage system 140 using a client computing device 110. In some cases, data stored in the storage system 140 may be a media file, and the user can access and request playback of the media file on the client computing device 110 (e.g., using a media player). For example, the client computing device 110 can send a request to a media server 130 for playback of the media file, and the media server 130 can retrieve the media file from the storage system 140. The media file can be provided to the client computing device 110, for example, for streaming. In some instances, the media server 130 and the client computing device 110 may be a part of or implemented on the same computing device. In some embodiments, a "host" can refer to a system or device from which data on a storage system or device is accessed or requested. For instance, the client computing device 110 or the media server 130 can be a host, depending on the embodiment. In some embodiments, a "device" can refer to a storage system or device from which data is obtained, for example, to provide to a host.

According to certain embodiments, the storage system 140 can be configured to provide parallel data transfer, as described herein. For example, the storage system 140 can include one or more storage devices 145, and parallel data transfer can be provided between a computing device, such as a client computing device 110, and a storage device 145 of the storage system 140 using multiple channels. Examples of different channels used for data transfer can include, but are not limited to, USB, Wi-Fi, and Bluetooth. Different transfer channels may also be referred to as transfer mediums. When the storage device 145 receives a read request or a write request from the client computing device 110 over a selected channel, a controller 146 of the storage device 145 can determine available channels for data transfer between the client computing device 110 and the storage device 145. If more than the selected channel is available, the controller 146 can perform load balancing to determine which portion of data is sent over which channel. The controller 146 can schedule transfer of different portions to obtain an earliest completion time and/or to reduce power consumption. The controller 146 can perform scheduling and load balancing based on various factors, including parameters associated with the storage device 145. Details relating to the various factors are described below. In order to accommodate parallel data transfer, the controller 146 can allocate a dedicated section of a TRAM for each available channel. Dedicated sections of the TRAM may be allocated dynamically. In some embodiments, the buffer 147 includes the TRAM. Parallel data transfer can apply to transfer of a single file as well as transfer of multiple files. For instance, a single file can be divided into multiple chunks, and the multiple chunks can be transferred over multiple channels. In certain embodiments, a file is a media file and may be provided to a media server 130 or a client computing device 110 for streaming. Details relating to providing parallel data transfer are described below, for example, in connection with FIGS. 2-7.

Figure 2:
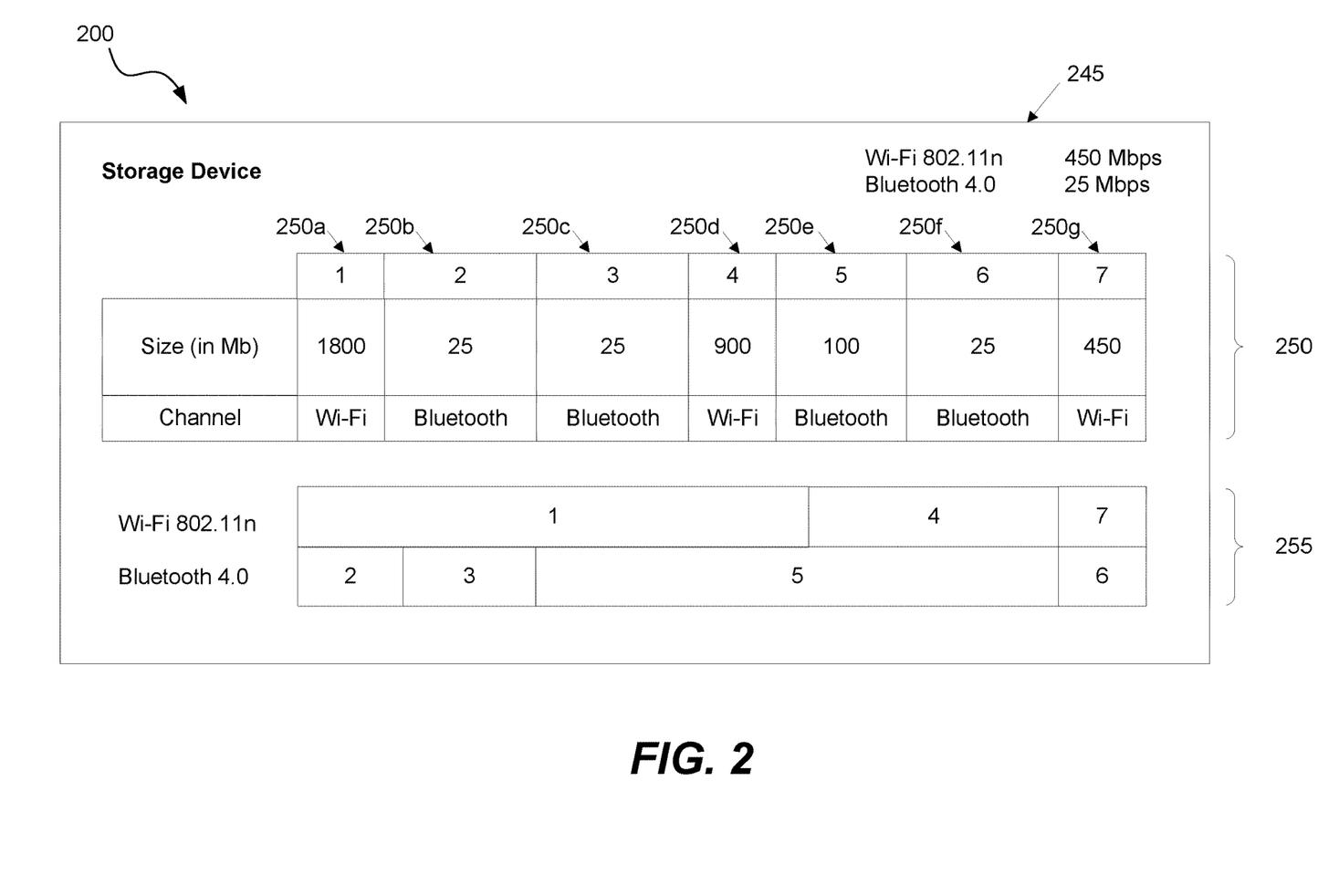
FIG. 2 is a block diagram illustrating an example scenario relating to parallel data transfer in a storage device, in accordance with one or more embodiments.

FIG. 2 is a block diagram 200 illustrating an example scenario for parallel data transfer in a storage device 245, in accordance with one or more embodiments. In some embodiments, components of FIG. 2 can be similar to components of FIG. 1 having similar names and/or reference numbers. For example, the storage device 245 can be similar to a storage device 145 in FIG. 1. Certain details relating to the block diagram 200 are described above in connection with FIG. 1.

In the example of FIG. 2, various requests have been received by the storage device 245. Requests can be for reading data or writing data. In some embodiments, requests may be referred to as tasks. In this example, the storage device 245 can utilize two channels for data transfer: Wi-Fi and Bluetooth. Two channels are shown for illustrative purposes, and any number of channels may be used as appropriate. Seven requests 250 have been received and scheduled. Each request 250 is shown with a size of data associated with the request 250 and a channel through which the request 250 is to be processed. Data associated with a request can be referred to as request data. As an example, Request 1 250*a* has request data that is 1,800 megabits (Mb) in size and is to be processed through Wi-Fi. Request 2 250*b* has request data that is 25 Mb in size and is to be processed through Bluetooth, and so forth. The requests 250 can be from one host or from multiple hosts. For instance, a host may be a client computing device 110 or a media server 130 in FIG. 1.

A host can send a request 250 over a selected channel from the available channels. In some embodiments, the storage device 245 can send request data for a request 250 over the channel from which the request 250 was received. In other embodiments, the storage device 245 can send request data for a request 250 over a channel that is different from the channel from which the request 250 was received. For instance, if both Wi-Fi and Bluetooth are enabled at a host, request data for a request 250 can be sent over either Wi-Fi or Bluetooth, depending on which channel will lead to better performance and/or other considerations.

In the example of FIG. 2, a request schedule 255 shows the requests 250 for each channel and an amount of time for transferring request data for the requests 255 for each channel. Request 1 250a, Request 4 250d, and Request 7 250g are scheduled to be processed over Wi-Fi, and have request data size of 1,800 Mb, 900 Mb, and 450 Mb, respectively. Request 2 250b, Request 3 250c, Request 5 250e, and Request 6 250f are scheduled to be processed over Bluetooth, and have request data size of 25 Mb, 25 Mb, 100 Mb, and 25 Mb, respectively. The speed of Wi-Fi channel is 450 megabits per second (Mbps), and the speed of Bluetooth channel is 25 Mbps. Accordingly, respective request data for Request 1 250a, Request 4 250d, and Request 7 250g take 4 seconds, 2 seconds, and 1 second to transfer over Wi-Fi. In the same amount of time, respective request data for Request 2 250b, Request 3 250c, Request 5 250e, and Request 6 250f take 1 second, 1 second, 4 second, and 1 second to transfer over Bluetooth.

The storage device 245 can schedule the requests 250 such that an earliest finish time can be achieved by load balancing among the different channels. A scheduling algorithm can ensure load balancing among the available channels, for example, taking into consideration the heterogeneous nature of the channels in terms of transfer and power consumption. FIG. 2 shows an example of scheduling requests to obtain a minimum finish time along with power savings when using both transfer channels simultaneously. For example, Wi-Fi requires 10 times more power than Bluetooth for processing the same request 250. Since Wi-Fi consumes more power, transfer may be distributed between Wi-Fi and Bluetooth such that transfer over both channels completes within a similar amount of time. In this way, the storage device 245 can achieve faster performance along with optimized power using parallel data transfer through available channels.

Figure 3:
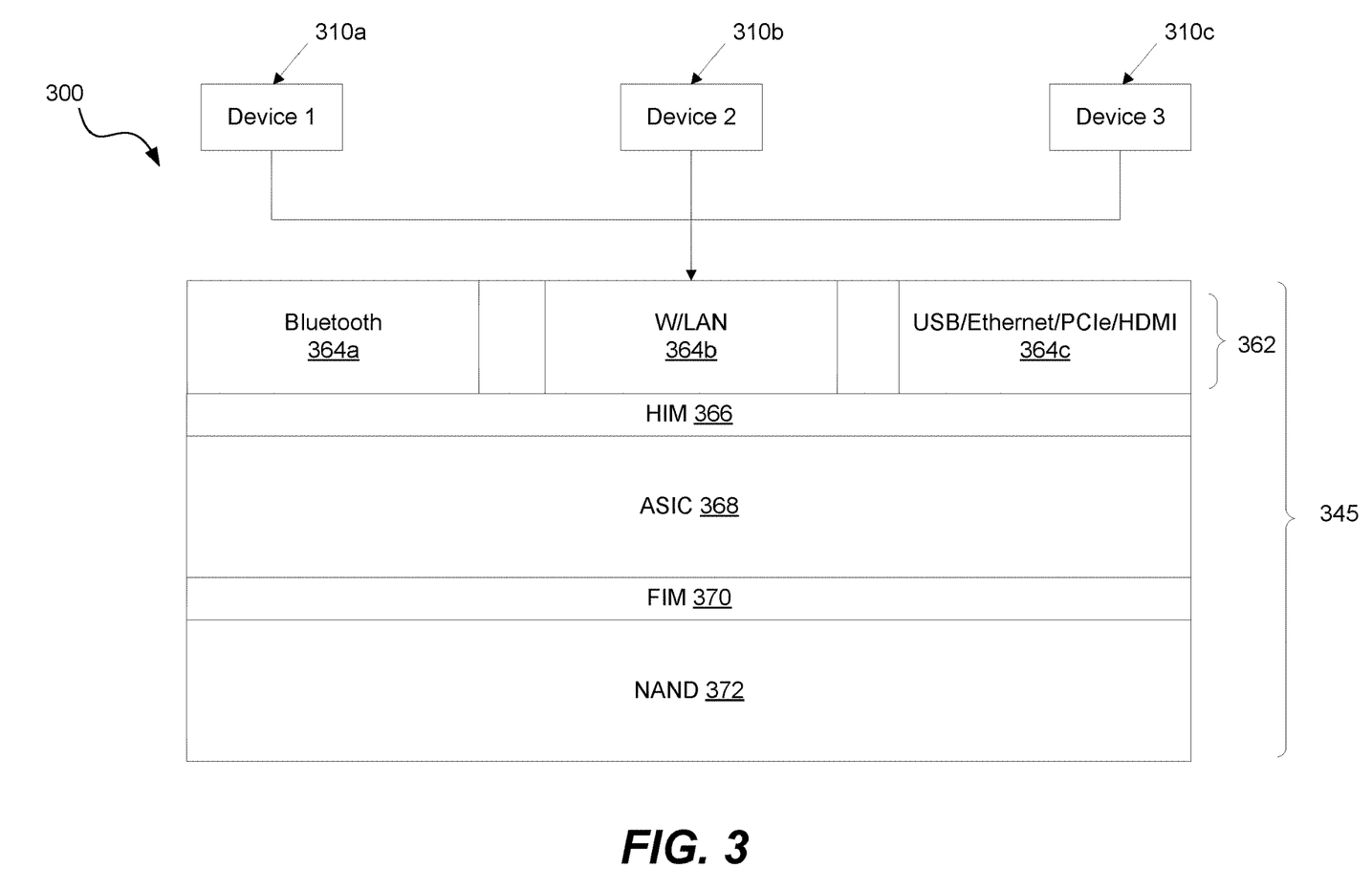
FIG. 3 is a block diagram illustrating an example storage device, in accordance with one or more embodiments.

FIG. 3 is a block diagram 300 illustrating an example storage device 345, in accordance with one or more embodiments. In some embodiments, components of FIG. 3 can be similar to components of FIGS. 1-2 having similar names and/or reference numbers. For example, the storage device 345 can be similar to a storage device 145, 245 in FIGS. 1-2. Certain details relating to the block diagram 300 are described above in connection with FIGS. 1-2.

The storage device 345 can receive requests from one or more computing devices 310. For instance, the storage device 345 can be an SSD device. In the example of FIG. 3, three transfer channels are available: USB, Wi-Fi, and Bluetooth. The storage device 345 can include a TRAM 362, a host interface manager (HIM) 366, an application specific integrated circuit (ASIC) 368, a flash interface manager (FIM) 370, and NAND 372. A controller of the storage device 345 can create a dedicated section of the TRAM 362 for each available channel. In FIG. 3, the TRAM 362 has a first section 364a for Bluetooth, a second section 364b for Wi-Fi, and a third section 364c for USB. The storage device 345 can have a command queue for incoming commands, and the commands can be scheduled based on the available channels. A controller of the storage device 345 can appropriately handle routing of the information for different requests from different channels by creating the respective sections 364. Data that is being read or written over a particular channel can be loaded into the corresponding section 364 of the TRAM 362 for that channel.

The sections 364 for the different channels in the TRAM 362 can be allocated dynamically. For instance, if any channel becomes unavailable or unused, memory for the corresponding section 364 can be allocated to other channels that are available. In certain embodiments, an amount of memory in a section 364 can be determined based on the transfer speed of a channel. For example, if a channel is faster than another channel, the faster channel can be assigned more memory in the TRAM 362 than the slower channel.

Figure 4:
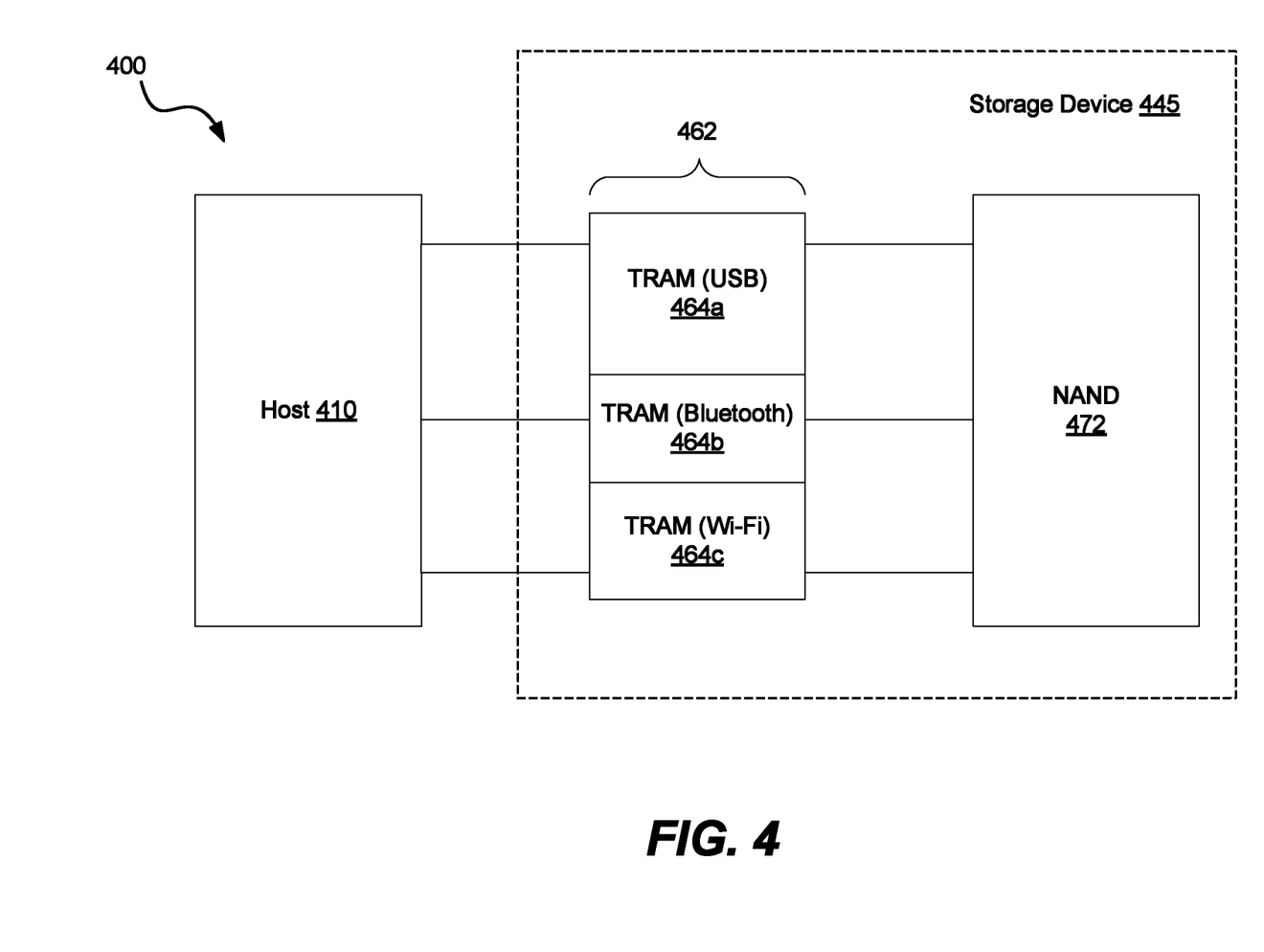
FIG. 4 illustrates a block diagram illustrating an example storage device, in accordance with one or more embodiments.

FIG. 4 is a block diagram 400 illustrating an example storage device 445, in accordance with one or more embodiments. In some embodiments, components of FIG. 4 can be similar to components of FIGS. 1-3 having similar names and/or reference numbers. For example, the storage device 445 can be similar to a storage device 145, 245, 345 in FIGS. 1-3. Certain details relating to the block diagram 400 are described above in connection with FIGS. 1-3.

The storage device 445 may communicate with one or more hosts 410. The storage device 445 can receive read requests or write requests from the host 410. In the example of FIG. 4, three channels are available for transfer as in FIG. 3, which include USB, Bluetooth, and Wi-Fi. Respective dedicated sections 464a-c for the three channels are allocated in a TRAM 462. The storage device 445 is an SSD in the example of FIG. 4 and includes NAND 472 as data storage.

The storage device 445 may perform load balancing and scheduling for data transfer associated with received requests based on various factors. For example, a load balancing/scheduling algorithm and any related functionalities and operations may be implemented by a controller of the storage device 445 at firmware level. Examples of such factors can include available channels, a transfer speed of a channel, power consumption of a channel, a power mode, a transfer speed of the host 410, a transfer speed of the storage device 445, a file type (e.g., a media file, etc.), etc. In some embodiments, such factors include parameters associated with the storage device 445. Examples of storage device parameters can include, but are not limited to, a NAND 472 speed, a NAND 472 cell type (e.g., SLC, MLC, etc.), device throttling, thermal throttling, a request type (e.g., a read request or a write request), a read speed, a write speed, a match between a transfer speed of the host 410 and a transfer speed of the storage device 445, an amount of memory in the TRAM 462 for each channel, background operations in firmware, such as garbage collection, etc. By implementing the load balancing/scheduling at the controller of the storage device 445, storage device parameters can be accessed and considered in the load balancing/scheduling. The load balancing and scheduling can be performed to obtain an earliest finish time for transfer associated with pending requests, reduce and optimize power consumption, maintain similar speeds for the host 410 and data storage (e.g., NAND 472) of the storage device 445, etc.

In certain embodiments, a file can be divided into multiple chunks for data transfer. Dividing a file into multiple chunks may be also be referred to as chunking the file. When the storage device 445 receives a read request for a file from the host 410, the file can be chunked, and the multiple chunks can be sent to the host 410 over different channels. The file can be chunked dynamically based on the available channels and/or other factors. The storage device 445 can determine a chunk size that is efficient for sending over the available channels. The host 410 can receive the multiple chunks over the different channels and combine the chunks into a single file as needed. In some embodiments, chunking of a file may also apply to a write request. For instance, the host 410 can send chunks for a file over multiple channels.

In some cases, a bottleneck in data transfer can occur either due to the host 410 or the storage device 445. The host 410 can become a bottleneck, for example, due to having a slower speed compared to an amount of memory. Data transfer can be most efficient when the host 410 speed matches the NAND 472 speed. Accordingly, the storage device 410 can try to maintain similar speeds for the host 410 and the NAND 472. When the host 410 is a bottleneck, data can be sent to the host 410 over all available channels to increase speed and throughput.

The NAND 472 can become a bottleneck due to various reasons, such as the NAND 472 type (e.g., SLC vs. MLC), device throttling (e.g., garbage collection), and thermal throttling. When the NAND 472 becomes a bottleneck, the controller can try to make the host 410 speed comparable to the NAND 472 speed in various ways. The host 410 can be throttled such that data transfer becomes more power efficient, for example, by making the host 410 speed comparable to the NAND 472 speed. For instance, if the NAND 472 speed is a maximum of 100 megabytes (MB) in one minute due to reduced NAND 472 performance, the storage device 445 can ensure that the host 410 only sends 100 MB of data per minute, which can make data transfer power efficient. The storage device 445 may enable/disable or control data chunking and transfers of communication channels on the host 410 side to match the NAND 472 performance and also to leverage parallelism among the channels. During throttling, the storage device 445 can be aware of device performance, and the load balancing algorithm can take performance values into consideration when scheduling transfers.

Various storage device parameters may be considered in load balancing/scheduling. One example can be the NAND 472 type. The NAND 472 type can include an SLC and an MLC. An SLC is generally faster than an MLC. Since reads are generally faster than writes, the controller can route writes to SLCs and reads to MLCs to increase speed. In some cases, the load balancing/scheduling can accommodate a latency associated with reading from an MLC. Another example can be the request type. A request can be a read request or a write request. Since reads are faster than writes, data transfer for a read request can be assigned to a faster channel, and data transfer for a write request can be assigned to a slower channel. For example, data transfer for read requests can be assigned to USB, and data transfer for write requests can be assigned to Wi-Fi or Bluetooth. An additional example can be an amount of memory in the TRAM 462 for each channel. As described above, sections 464 in the TRAM 462 for different channels can be created or allocated dynamically. If a channel becomes unavailable, memory of the section 464 assigned for that channel can be allocated to other channels that are available.

In certain embodiments, garbage collection may also be considered in load balancing/scheduling. Garbage collection can maintain empty blocks for writing data, for example, by merging data into new blocks and erasing old blocks. A block can include multiple pages, and a page can include multiple NAND 472 cells. Data can be written in units of pages, and data may be erased in units of blocks. If data in some pages of a block is no longer needed, data in other pages of the block that is still needed can be rewritten to an empty block, and the block can be erased to be available for writing new data. Performance of the storage device 445 can be reduced during garbage collection, and the controller can consider performance values when scheduling transfers. For instance, the controller may make the host 410 speed comparable to the NAND 472 speed in order to increase efficiency.

In some embodiments, one or more channels may be enabled or disabled based on various factors. For example, if the host 410 and/or the storage device 445 are in a low power mode, only one channel may be enabled, such as Bluetooth. All examples described herein are provided for illustrative purposes, and there can be many variations and other possibilities.

In this manner, a storage system for providing parallel data transfer between a host and a storage device can utilize multiple available channels, which can improve performance and power optimization. A storage device may select best available channels for transfer speed, instead of a host. Various factors and/or storage device parameters can be considered in load balancing/scheduling, which can make data transfer more efficient. In some instances, read requests and write requests may be processed in parallel over the different channels. Different files or different portions of the same can be transferred over the multiple channels. A storage device may simultaneously process multiple requests from multiple hosts.

Figure 5:
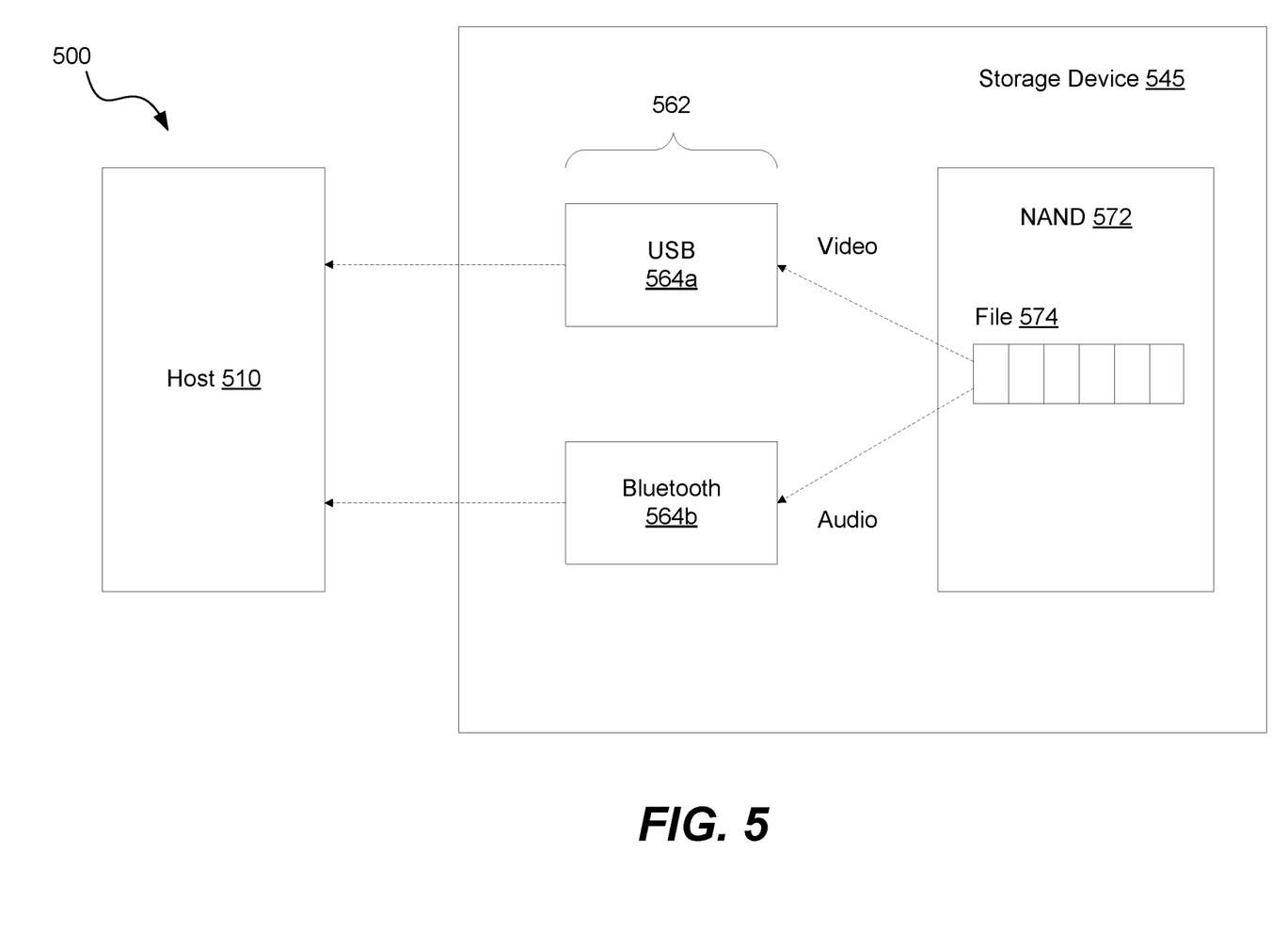
FIG. 5 illustrates a block diagram illustrating an example scenario relating to parallel data transfer in an example storage device, in accordance with one or more embodiments.

FIG. 5 is a block diagram 500 illustrating an example scenario relating to parallel data transfer in an example storage device 545, in accordance with one or more embodiments. In some embodiments, components of FIG. 5 can be similar to components of FIGS. 1-4 having similar names and/or reference numbers. For example, the storage device 545 can be similar to a storage device 145, 245, 345, 445 in FIGS. 1-4. Certain details relating to the block diagram 500 are described above in connection with FIGS. 1-4.

The example of FIG. 5 illustrates dividing a media file 574 into chunks to transfer over multiple channels. For example, the storage device 545 can receive a read request for the media file 574 from a host 510, which may be a client computing device or a media server. The storage device 545 is an SSD and includes NAND 572 as data storage. The media file 574 is stored on the NAND 572 and includes video data and audio data. In general, the video data is larger in size than the audio data. Accordingly, the storage device 545 can divide the media file 574 into chunks containing video data and chunks containing audio data, and send the chunks containing video data over a faster channel and the chunks containing audio data over a slower channel. In this example, available channels are USB and Bluetooth. The chunks containing video data are transferred over USB and are loaded into a section 564*a* of a TRAM 562 for USB. The chunks containing audio data are transferred over Bluetooth and are loaded into a section 564*b* of the TRAM 562 for Bluetooth. The video chunks and the audio chunks are transferred to the host 510 in parallel over the two different channels. In this way, transfer time and speed can be improved. In some embodiments, the media file 574 may be provided for playback, for example, via a media server, and the storage device 545 can be configured to synchronize the transfer of the video data and the audio data. As shown in FIG. 5, different types of data may be transferred over separate channels in some cases. In certain embodiments, sending video data and audio data for a media file in chunks over different channels can also be implemented for a write request.

Figure 6:
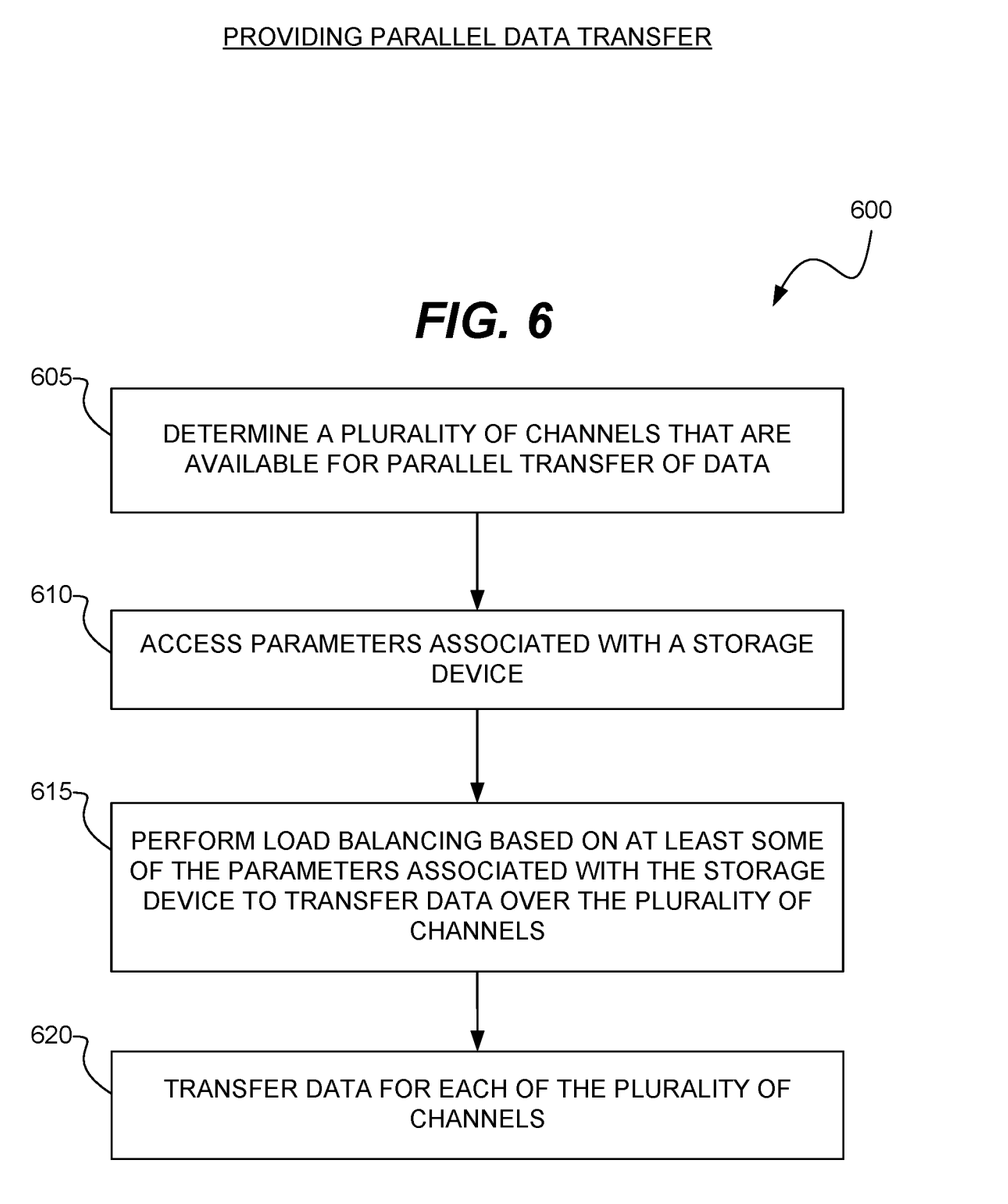
FIG. 6 illustrates a workflow process for load balancing for parallel data transfer, in accordance with one or more embodiments.

FIG. 6 illustrates a workflow process 600 for load balancing for parallel data transfer, in accordance with one or more embodiments. For example, the workflow process 600 may be performed by a controller of a storage system or a storage device, such as a storage system 140 or a storage device 145 in FIG. 1. For illustrative purposes, the process 600 is explained below in connection with the storage device 145. Certain details relating to the process 600 are explained in more detail with respect to FIGS. 1-5. Depending on the embodiment, the process 600 may include fewer or additional blocks, and the blocks may be performed in an order that is different from illustrated.

At block 605, the storage device 145 can determine a plurality of channels that are available for parallel transfer of data. At block 610, the storage device 145 can access parameters associated with the storage device 145. Storage parameters are described above in more detail. At block 615, the storage device 145 can perform load balancing based on at least some of the parameters associated with the storage device 145 to transfer data over the plurality of channels. At block 620, the storage device 145 can transfer data for each of the plurality of channels.

Figure 7:
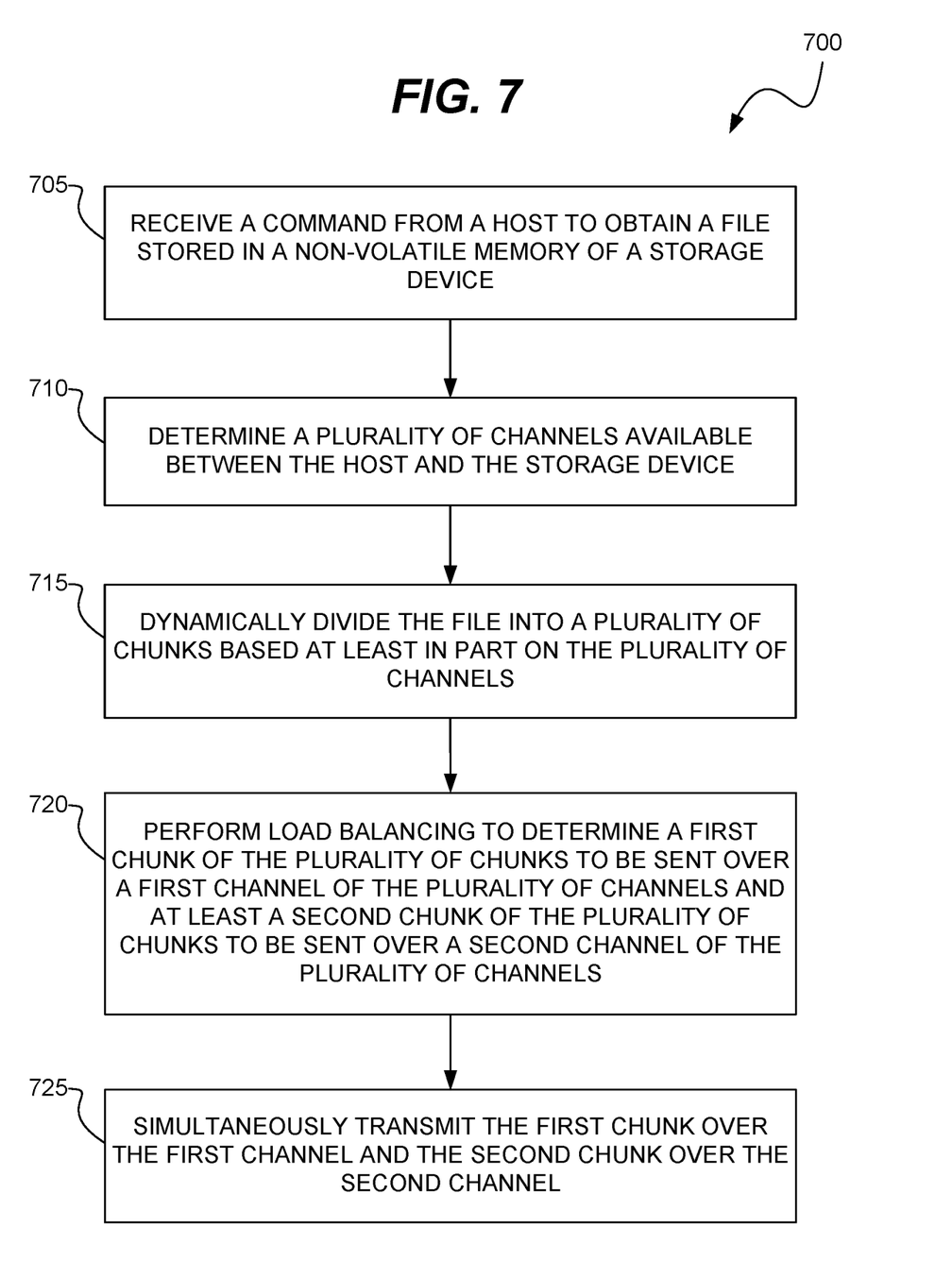
FIG. 7 illustrates a workflow process for providing parallel data transfer, in accordance with one or more embodiments.

FIG. 7 illustrates a workflow process 700 for providing parallel data transfer, in accordance with one or more embodiments. For example, the workflow process 700 may be performed by a controller of a storage system or a storage device, such as a storage system 140 or a storage device 145 in FIG. 1. For illustrative purposes, the process 700 is explained below in connection with the storage device 145. Certain details relating to the process 700 are explained in more detail with respect to FIGS. 1-6. Depending on the embodiment, the process 700 may include fewer or additional blocks, and the blocks may be performed in an order that is different from illustrated.

At block 705, the storage device 145 can receive a command from a host to obtain a file stored in a non-volatile memory of the storage device 145. At block 710, the storage device 145 can determine a plurality of channels available between the host and the storage device 145. In some embodiments, the plurality of channels includes one or more of: Universal Serial Bus (USB), Wi-Fi, or Bluetooth.

At block 715, the storage device 145 can dynamically divide the file into a plurality of chunks based at least in part on the plurality of channels. The storage device 145 can determine a size of a chunk for dividing the file into the plurality of chunks.

At block 720, the storage device 145 can perform load balancing to determine a first chunk of the plurality of chunks to be sent over a first channel of the plurality of channels and at least a second chunk of the plurality of chunks to be sent over a second channel of the plurality of channels. In some embodiments, the storage device 145 can perform load balancing for at least some of the plurality of chunks to obtain an earliest transfer completion time over the plurality of channels. In certain embodiments, the storage device 145 can perform load balancing for at least some of the plurality of chunks to reduce power consumption of the storage device 145.

In some embodiments, the storage device 145 can allocate a section of a transfer random-access memory (TRAM) for each channel of the plurality of channels. For example, an amount of memory allocated to the section of the TRAM for each channel is determined based on a transfer speed of the channel.

In some embodiments, the storage device 145 can perform load balancing for at least some of the plurality of chunks based at least in part on parameters associated with the storage device 145. As an example, the storage device 145 includes a solid-state drive, and the non-volatile memory includes NAND memory. In certain embodiments, the parameters include one or more of: a NAND speed, a NAND cell type, device throttling, thermal throttling, a request type, a read speed, a write speed, a match between a transfer speed of the host and a transfer speed of the storage device 145, garbage collection, or an amount of memory in a section of a transfer random-access memory (TRAM) for a channel of the plurality of channels.

In some embodiments, the file is a media file, the first chunk includes video data, and the second chunk includes audio data. For instance, the first channel is USB and the second channel is Bluetooth.

At block 725, the storage device 145 can simultaneously transmit the first chunk over the first channel and the second chunk over the second channel.

Figure 8:
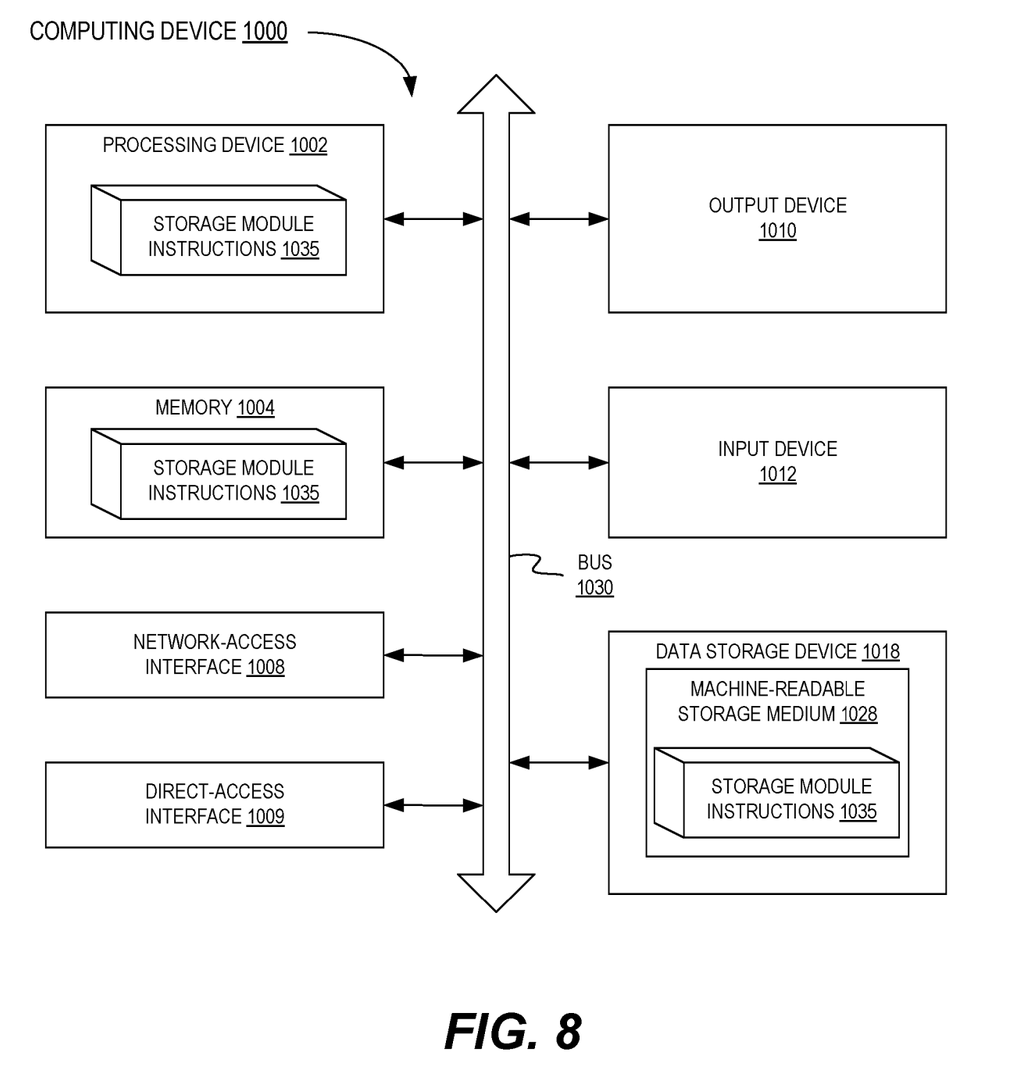
FIG. 8 is a diagram of a computing device, in accordance with one or more embodiments.

FIG. 8 is a diagram of a computing device 1000, in accordance with one or more embodiments. The computing device 1000 may execute instructions that may cause the computing device 1000 to perform any one or more of the methodologies (e.g., operations, methods, functions, etc.) discussed herein. The computing device 1000 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 1000 includes a processing device (e.g., a processor, a controller, a central processing unit (CPU), etc.) 1002, a main memory 1004 (e.g., read-only memory (ROM), flash memory, dynamic random-access memory (DRAM) such as synchronous DRAM (SDRAM)), a network-access interface 1008, a direct-access interface 1009, an output device 1010, an input device 1012, and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIVV) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute storage module instructions 1035 for performing the operations and steps discussed herein.

The computing device 1000 may include a network-access interface 1008 (e.g., a network interface card, a Wi-Fi interface, etc.) which may communicate with a network (e.g., network 120 illustrated in FIG. 1). The computing device may also include a direct-access interface 1009 (e.g., a USB interface, an external Serial Advanced Technology Attachment (eSATA) interface, a Thunderbolt interface, etc.). The computing device 1000 also may include an output device 1010 (e.g., a liquid crystal display (LCD) or a cathode ray tube (CRT)), and an input device 1012 (e.g., a mouse, a keyboard, etc.). In one embodiment, the output device 1010 and the input device 1012 may be combined into a single component or device (e.g., an LCD touch screen).

The data storage device 1018 may include a computer-readable storage medium 1028 on which is stored one or more sets of instructions (e.g., storage module instructions 1035) embodying any one or more of the methodologies or functions described herein. The storage module instructions 1035 may also reside, completely or at least partially, within the main memory 1004 and/or within the processing device 1002 during execution thereof by the computing device 1000. The main memory 1004 and the processing device 1002 may also constitute computer-readable media. The instructions may further be transmitted or received over via the network-access interface 1008 and/or direct-access interface 1009.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
a non-volatile memory; and
a controller configured to:
receive a command from a host to obtain a file stored in the non-volatile memory;
determine a plurality of channels available for transferring data between the host and the data storage device, wherein the plurality of channels includes channels having different channel types;
dynamically divide the file into a plurality of chunks based at least in part on the plurality of channels;
perform load balancing to determine a first chunk of the plurality of chunks to be sent over a first channel of the plurality of channels and at least a second chunk of the plurality of chunks to be sent over a second channel of the plurality of channels, wherein the first channel has a first channel type and the second channel has a second channel type that is different from the first channel type; and
simultaneously transmit the first chunk over the first channel and the second chunk over the second channel, wherein the first chunk includes a first type of data and the second chunk includes a second type of data that is different from the first type of data.

2. The data storage device of claim 1, wherein the plurality of channels includes one or more of: Universal Serial Bus (USB), Wi-Fi, or Bluetooth.

3. The data storage device of claim 1, wherein the controller is further configured to determine a size of a chunk for dividing the file into the plurality of chunks.

4. The data storage device of claim 1, wherein the controller is further configured to allocate a section of a transfer random-access memory (TRAM) for each channel of the plurality of channels.

5. The data storage device of claim 4, wherein an amount of memory allocated to the section of the TRAM for each channel is determined based on a transfer speed of the channel.

6. The data storage device of claim 1, wherein the file is a media file, the first chunk includes video data, and the second chunk includes audio data.

7. The data storage device of claim 6, wherein the first channel is Universal Serial Bus (USB) and the second channel is Bluetooth.

8. The data storage device of claim 1, wherein the controller is further configured to perform load balancing for at least some of the plurality of chunks to obtain an earliest transfer completion time over the plurality of channels.

9. The data storage device of claim 1, wherein the controller is further configured to perform load balancing for at least some of the plurality of chunks to reduce power consumption of the data storage device.

10. The data storage device of claim 1, wherein the controller is further configured to perform load balancing for at least some of the plurality of chunks based at least in part on parameters associated with the data storage device.

11. The data storage device of claim 10, wherein the data storage device includes a solid-state drive and the non-volatile memory includes NAND memory.

12. The data storage device of claim 11, wherein the parameters include one or more of: a NAND speed, a NAND cell type, device throttling, thermal throttling, a request type, a read speed, a write speed, a match between a transfer speed of the host and a transfer speed of the data storage device, garbage collection, or an amount of memory in a section of a transfer random-access memory (TRAM) for a channel of the plurality of channels.

13. A method of providing parallel data transfer in a data storage system, the method comprising:
receiving a command from a host to obtain a file stored in a non-volatile memory of a data storage system;
determining a plurality of channels available for transferring data between the host and the data storage system, wherein the plurality of channels includes channels having different channel types;
dynamically dividing the file into a plurality of chunks based at least in part on the plurality of channels;
performing load balancing to determine a first chunk of the plurality of chunks to be sent over a first channel of the plurality of channels and at least a second chunk of the plurality of chunks to be sent over a second channel of the plurality of channels, wherein the first channel has a first channel type and the second channel has a second channel type that is different from the first channel type; and
simultaneously transmitting the first chunk over the first channel and the second chunk over the second channel, wherein the first chunk includes a first type of data and the second chunk includes a second type of data that is different from the first type of data.

14. The method of claim 13, further comprising determining a size of a chunk for dividing the file into the plurality of chunks.

15. The method of claim 13, further comprising allocating a section of a transfer random-access memory (TRAM) for each channel of the plurality of channels.

16. The method of claim 15, wherein an amount of memory allocated to the section of the TRAM for each channel is determined based on a transfer speed of the channel.

17. The method of claim 13, wherein the file is a media file, the first chunk includes video data, and the second chunk includes audio data.

18. The method of claim 13, further comprising performing load balancing for at least some of the plurality of chunks to obtain an earliest transfer completion time over the plurality of channels.

19. The method of claim 13, further comprising performing load balancing for at least some of the plurality of chunks to reduce power consumption of the data storage system.

20. A data storage system comprising:
a non-volatile memory; and
a controller means configured to:
receive a command from a host to obtain a file stored in the non-volatile memory;
determine a plurality of channels available for transferring data between the host and the data storage system, wherein the plurality of channels includes channels having different channel types;
dynamically divide the file into a plurality of chunks based at least in part on the plurality of channels;
perform load balancing to determine a first chunk of the plurality of chunks to be sent over a first channel of the plurality of channels and at least a second chunk of the plurality of chunks to be sent over a second channel of the plurality of channels, wherein the first channel has a first channel type and the second channel has a second channel type that is different from the first channel type; and simultaneously transmit the first chunk over the first channel and the second chunk over the second channel, wherein the first chunk includes a first type of data and the second chunk includes a second type of data that is different from the first type of data.

\* \* \* \* \*